United States Patent
Allsup

[15] 3,659,653
[45] May 2, 1972

[54] STOCK FOR SHOEING ANIMALS

[72] Inventor: Oliver L. Allsup, P. O. Box 274, High Rolls, N. Mex. 88325

[22] Filed: Oct. 7, 1970

[21] Appl. No.: 78,823

[52] U.S. Cl. .................................................. 168/44
[51] Int. Cl. ........................................... A01l 07/00
[58] Field of Search ................... 168/44; 119/98

[56] References Cited

UNITED STATES PATENTS

| | | | |
|---|---|---|---|
| 124,452 | 3/1872 | Shimer | 168/44 |
| 391,893 | 10/1888 | Green et al. | 168/44 |
| 554,944 | 2/1896 | Menard | 168/44 |
| 1,270,204 | 6/1918 | Pinegar | 168/44 |

Primary Examiner—Hugh R. Chamblee
Attorney—Richard A. Bachand

[57] ABSTRACT

A stock for shoeing animals including on a tripod base a channel for receiving a leg of the animal, the channel having adjacent thereto means for adjustably constraining the hoof. A foot lever is provided to control the constraining means against a normally applied bias away from the constraining position to rapidly release the animal from the constraining means when the foot lever is released so as not to endanger the animal if it bolts.

14 Claims, 2 Drawing Figures

Patented May 2, 1972

3,659,653

INVENTOR
OLIVER L. ALLSUP
by Richard L. Bachand
ATTORNEY

3,659,653

STOCK FOR SHOEING ANIMALS

BACKGROUND OF THE INVENTION

1. Field of the Invention

This invention relates to livestock equipment, and more particularly to a stock for shoeing animals.

2. Description of the Prior Art

Shoeing animals is an exacting art involving the backbreaking job of raising and holding the hoof, usually between the shoer's legs, while preparing and fitting it with a shoe of iron or other tough material. The job is complicated by the delicate operations which must be performed in the shoeing process, as a mistake in shoeing can be disabling to the animal. Furthermore, in certain applications, such as in fitting shoes to race horses, a particular balance must be maintained among its shoes. The job is made more difficult by individual horses which, for example, learn to lean on the shoer, or which may shy from the shoer.

In attempts to ease the burden upon animal shoers, and particularly horse shoers upon whom rest inordinate demands, stocks to hold the animal's hoof have been proposed. The need for such stocks has been long recognized, some embodiments being advanced and patented as early as 1871. For instance, Stansel, in U.S. Pat. No. 120,119 taught an "Improvement in Horse Shoeing Rest," and in 1872, Shimer, in U.S. Pat. No. 124,452 taught an "Improvement in Horse-shoeing Jacks." These and other earlier stocks, and those continuing to date, however, have been unsatisfactory, some, in fact, dangerous to the animal.

Many stocks heretofore proposed are mounted on large or heavy blocks, and, frequently, therefore, are unstable, hampering rather than helping the shoer by frightening the animal.

Many other stocks or stands, including those of Stansel and Shimer, above, physically strap or brace the horse's leg to the stand, an extremely dangerous practice, endangering the horse if it becomes excited and bolts or jumps as its leg is trapped in the stand, and may easily be broken.

Some inventors, recognizing this danger, have advanced stocks which include a safety feature, in attempts to minimize the danger inherent in such brace, strap, or other rigid-holding type stocks. For example, the stock described by Pinegar in his U.S. Pat. No. 1,270,204 for a "Horse-shoeing Stool" shows a stock having clamping members to support the horse's hoof which are separated by a semi-rigid spring to yieldingly hold the hoof so that if the horse loses its balance it can pull its hoof loose. This type stock has several apparent disadvantages, the foremost being the difficulty involved in placing the hoof within the jaws and the lack of control the shoer has over the horse. Also the spring mechanism must be adjusted each time a hoof is placed within the jaws. Furthermore, once the horse learns that he can pull his hoof from the jaws, he will, of course, do so rather than be subjected to the shoeing processes.

Another frequently involved consideration is the position the horse's hoof is carried by the stock. Many of the stocks advanced are designed to hold the hoof with the shoe downward, rather than facing the back in the normal shoeing position. This is usually achieved by a clamping device which may be affixed to the shoe itself. The difficulties encountered by these stocks also are readily apparent. For example, the shoer must virtually work upside down in preparing the hoof and affixing the new shoe.

SUMMARY OF THE INVENTION

In light of the above, therefore, it is an object of the invention to provide a stock for holding the hoof of an animal for shoeing, which is rapidly releasable to decrease, from stocks heretofore advanced, the chance of injuring the animal, and which will firmly hold the hoof while the shoer is working on it, with a degree of firmness always under the control of the shoer.

It is another object of the invention to provide a stock which is stable under the load from the weight of the animal upon it, and which will comfortably support the animal.

It is still another object of the invention to provide a stock which may be used on either side and on both front and rear legs of the animal, with easily made adjustments, and which will hold the hoof being shoed in a normal rearwardly facing direction.

It is a further object of the invention to present a stock which will achieve the above objects with an uncomplicated, easily operated mechanism.

These and other objects, features, and advantages are described below in detail and will become apparent to those skilled in the art from a careful reading of the following detailed description, appended claims, and accompanying drawing.

Thus, in accordance with the invention, a stock for shoeing animals is presented including a tripod supporting frame carrying a channel to receive a leg of the animal to be shoed, having hingedly carried by the channel, two arcuate plates adjustable to constrain the hoof from moving, and normally biased away from the constraining adjustment by bias means attached thereto. Also provided as a part of the stock is a foot lever connected to the arcuate plates to move them to a desired constraining adjustment against the bias to give the shoer control either to hold the hoof with a certain degree of restraint or to release it entirely.

BRIEF DESCRIPTION OF THE DRAWING

The invention is illustrated in the accompanying drawing wherein.

DESCRIPTION OF THE PREFERRED EMBODIMENT

Figure 1:
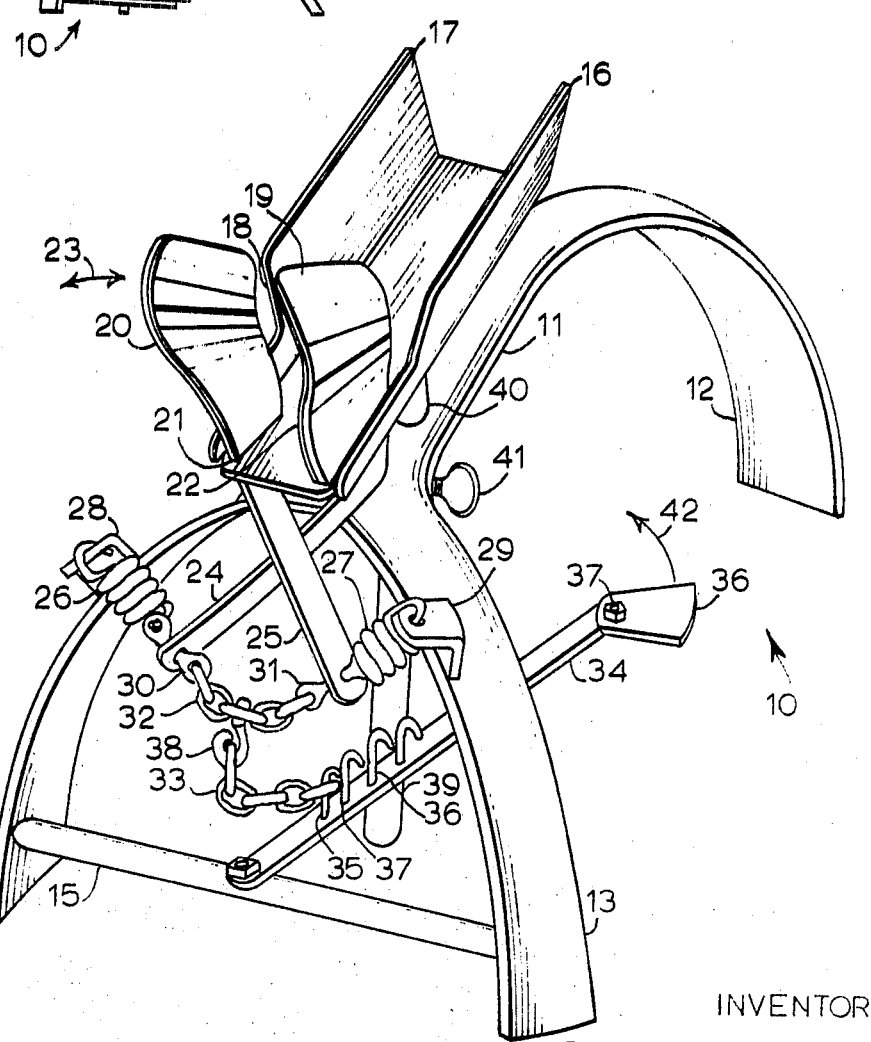
FIG. 1 is a perspective view of a preferred embodiment of the horseshoeing stock in accordance with the invention.

In accordance with the present invention, the stock for holding an animal's hoof for shoeing is illustrated in FIG. 1, and is denoted generally by the reference numeral 10. The stock may be constructed on a frame or base 11, having, for example, as illustrated, a forward leg 12 and two rear legs 13 and 14 to form a sturdy tripod configuration. The rear legs 13 and 14 may be interconnected by crossbar 15, which will function as a part of the operating mechanism of the stock described below in detail, as well as adding support and strength to the rear legs 13 and 14.

Adjustably carried by the support frame 11 is a leg and hoof receiving trough 16, formed by welding or otherwise attaching three pieces of material together, as illustrated, or, alternatively, by bending a single piece of material (not shown) into a "U" shaped configuration. The wall portions of trough 16 may be partially cut away at one end, as shown by reference numeral 18, to enable means for constraining the hoof to be conveniently disposed thereat. Such constraining means may be two complementary arcuate plates 19 and 20 designed to clamp the animal's hoof between them. Thus, the curvature of the plates may be designed to fit the approximate outside surface of the animal's hoof to contact as much of it as possible.

To achieve the constraining action of the arcuate plates 19 and 20 they may be hingedly mounted upon the trough 16 by hinges or the like or by placing them in slots, such as slots 21 and 22 shown, in a manner allowing them to be moved back and forth in the direction of the arrows 23. In the embodiment shown, the arcuate plates 19 and 20 have actuating levers 24 and 25, respectively, formed as a part thereof to control the plates. The levers 24 and 25 may be in breadth only a fraction of the width of plates 19 and 20, and may extend through slots 21 and 22 in trough 16, also of length less than the width of plates 19 and 20, to achieve the hinging action described above.

Since a large percentage of the horse's weight must be supported by the relatively small surface of the trough 16, its inside surfaces and the inside surfaces of arcuate plates 19 and 20 may be covered by a layer of rubber, sponge, or other material, such as lining 17 illustrated.

The plates 21 and 22, are normally biased away from each other by a means for biasing, such as springs 26 and 27, connected between the actuating levers 24 and 25 and the legs 13 and 14, respectively, of the frame 11. Alternatively, the means for biasing plates 19 and 20 may be directly interconnecting actuating levers 24 and 25 (not shown). In either embodiment, the biasing means is designed to maintain a normal position of plates 19 and 20 away from the position they assume in operation constraining the animal's hoof. Thus, unless a positive force is exerted upon the actuating levers 24 and 25 overcoming the bias, the plates 19 and 20 will not restrain the animal in the stock.

For convenience, the biasing springs 26 and 27 may be attached to brackets 28 and 29 on legs 13 and 14, and may be connected either directly to the lever arms 24 and 25 or to eye members 30 and 31 attached to the levers 24 and 25. The levers 24 and 25 may be interconnected by a chain 32 or other linking device, which may additionally be connected to eye members 30 and 31. A second linking device, such as a chain 33, may be provided to transfer a tension into chain 32 to overcome the bias of the springs 26 and 27 to move plates 19 and 20 together. This clamping action may be achieved by foot lever 34 hingedly attached to cross bar 15, and to which chain 33 may be connected by hook 35 or other such means. The means of attachment of foot lever 34 to cross bar 15 is not critical, and may, as shown, be achieved by a bolt which is not tightened completely to its limit, thus allowing a considerable play in the upward and downward movement of foot lever 34. For convenience, a foot plate 36 may be bolted by bolt 37 to an end of foot lever 34. The foot plate 36 may be rotatably mounted to be movable to extend in either direction from foot lever 34, for example, should the stock be used on the left or right side of the animal.

Since, depending upon the size of the hoof of the animal to be shoed, it may be desirable to adjust the extent of travel of plates 19 and 20, additional hooks 36 and 37 may be provided at various locations along foot lever 34. Also, the connection between chains 32 and 33 may be made by a hook linkage 38 which can, if desired, be attached to any desired link along the length of chain 33.

Because animals commonly shoed are of various heights, the receiving trough 16 is vertically adjustable with respect to frame 11. This adjustment is achieved by telescoping cylinders 39 and 40, cylinder 39 being attached to frame 11 and cylinder 40 being attached to the trough 16. The extent of vertical adjustment may be determined and maintained by adjusting screw 41 extending through a wall of cylinder 39 to engage the surface of cylinder 40.

Figure 2:
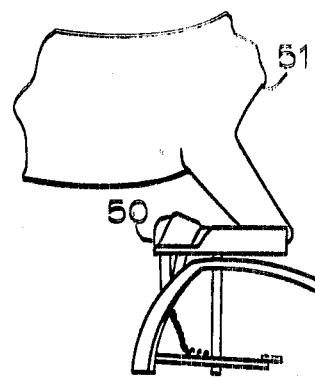
FIG. 2 is a side view of the horseshoeing stock of the invention illustrating its mode of operation.

Thus, in operation, the stock of the invention is disposed beneath the animal to be shoed, as illustrated in FIG. 2, and its leg and hoof placed within the trough 16. The horseshoer depresses the foot lever 34 causing the arcuate hoof clamping plates 19 and 20 to be moved together to clamp therebetween the hoof 50 of the animal 51 to a desired firmness controlled by the shoer by adjusting the downward pressure he exerts upon the lever 34. It can be seen that as long as the horseshoer maintains pressure on the foot lever 34, the horse's hoof 50 is firmly clamped between the hoof clamping plates 19 and 20 preventing the horse from pulling his hoof from the stock. If the horse bolts or becomes frightened, the horseshoer simply removes his foot from the foot lever 34, and the springs 26 and 27 immediately pull the clamping plates 19 and 20 apart, thereby releasing the animal to prevent injury to it.

When the animal is to be shoed on the opposite side, the foot lever 34 is depressed beneath the cylinder 39, to the other side of the stock (not shown) and the foot plate 36 is rotated in the direction of the arrow 42 (FIG. 1) to allow the stock to be operated from the other side. The cylinder 39 may be centrally disposed within frame 11 in a manner to allow the foot lever 34 to be slideably engaged thereupon to prevent sideward movement of the lever 34 when being depressed by the shoer and to give the shoer additional control of the operation of the stock 10.

Since the stock of the invention is to substantially bear the weight of the animal normally placed on the leg being shoed, the various parts of the stock should be fabricated of an appropriately strong material. For example, it is anticipated that the frame 11 and the receiving trough 16 and clamping plates 19 and 20 should be fabricated of iron, steel, or other metal having sufficient strength to support the heavy weight to be placed upon it.

Although the invention has been described with certain degree of particularity, it is understood that the present disclosure has been made only by way of example and that numerous changes in the details of construction and the combination and arrangement of parts may be resorted to without departing from the spirit and scope of the invention as hereinafter claimed.

What is claimed is:

1. A stock for use in shoeing an animal comprising:
   a supporting frame;
   a channel carried by said frame for receiving a portion of one of the legs including the hoof of the animal;
   two arcuate plates hingedly carried by said channel having a constraining adjustment to prevent the hoof from moving therebetween and a non-constraining adjustment at which the hoof is free to move;
   means attached to each of said plates for biasing said plates away from said constraining adjustment to said non-constraining adjustment; and
   a foot lever connected to said plates for controllably overcoming the bias provided by said means for biasing said plates, for moving said plates to said constraining adjustment.

2. The stock of claim 1 further comprising two actuating levers, each attached to one of said plates for controlling the movement thereof.

3. The stock of claim 2 wherein said means for biasing said plates are two springs, each connected between one of said actuating levers and said frame.

4. The stock of claim 3 wherein said supporting frame comprises three legs forming a tripod support.

5. The stock of claim 4 wherein said channel is adjustably carried by said frame by an assembly comprising:
   two cylindrically shaped members telescopically mounted one within the other, one being affixed to said frame, the other being affixed to said receiving channel; and
   a lock screw extending through a wall of said outer member to engage said inner member to prevent the members from moving with respect to each other.

6. The stock of claim 5 wherein said foot lever is adjustable to be operated from either side of said stock to allow the stock to be used on either side of the animal.

7. A stock for holding and supporting a horse's hoof for shoeing, comprising:
   a frame,
   a channel carried by said frame to receive, carry, and support the horse's hoof and a portion of its leg,
   means adjacent to and carried by a portion of said channel for constraining the hoof, said constraining means having a first position to grasp the hoof and a second position to release the hoof,
   means between said frame and said constraining means for normally biasing said constraining means to said second position, and
   means attached to said constraining means for manually moving said constraining means between said second and first positions, whereby when the horse's leg and hoof are positioned in said channel and said constraining means moved to said first position, the horse's hoof is held by said constraining means in position for shoeing, and when said manually moving means is released, said biasing means causes said constraining means to rapidly release the hoof.

8. The stock of claim 7 wherein said means for constraining the hoof comprises:

two complementary arcuate plates having curvature approximately the same as the outside surface of the hoof, hingedly carried to said channel.

9. The stock of claim 8 further comprising two actuating levers, each formed as a part of one of said arcuate plates of width less than the width of said plates and disposed through a slot also of width less than said plates to hinge said plates with respect to said frame.

10. The stock of claim 9 wherein said means for biasing said constraining means are springs.

11. The stock of claim 10 wherein said means for manually moving said constraining means is a foot lever hingedly attached to said frame, and further comprising a first chain interconnecting said actuating levers and a second chain interconnecting said foot lever and said first chain, whereby downward movement of said foot lever pulls said chains against said bias to move said plates to said first position.

12. The stock of claim 11 further comprising a rubber lining on the inside of said channel and on the portion of said plates which constrain the hoof.

13. The stock of claim 11 further comprising means for vertically adjusting said channel attached between said channel and said frame.

14. A stock for use in shoeing horses and like animals, comprising:
   a unitary tripod frame;
   a cross bar interconnecting two of the legs of said tripod frame;
   a channel for receiving a leg and hoof of the animal;
   two telescoping cylinders, one attached to a central portion of said frame and one attached to said channel, for vertically adjusting said channel with respect to said frame;
   two members, each having an arcuate plate portion and an extending portion of width less than the arcuate portion, said extending portion being disposed in a slot in said channel of length less than the width of said arcuate portion to carry said members upon said channel;
   two springs, each attached between one of the legs of said frame and the extending portion of one of said members to normally bias said members away from each other;
   a foot lever freely attached to said crossbar to move in upward and downward directions,
   first and second chains, the first interconnecting the extending portions of said two members, the second interconnecting said first chain and said foot lever;
   whereby when the leg and hoof of the animal to be shoed are placed within said channel and the foot lever moved and held in a downward direction, said two members are moved against the spring bias to constrain the hoof therebetween, and when the foot lever is released from the downward direction, the spring bias moves said two members away from each other to release the animal from the stock.

* * * * *